(12) United States Patent
Gang et al.

(10) Patent No.: US 11,171,392 B2
(45) Date of Patent: Nov. 9, 2021

(54) BATTERY MODULE, AND BATTERY PACK AND AUTOMOBILE COMPRISING SAME

(71) Applicant: LG CHEM, LTD., Seoul (KR)

(72) Inventors: In-Jae Gang, Daejeon (KR); Jung-Il Park, Daejeon (KR); Jong-Kyu Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 62 days.

(21) Appl. No.: 16/703,588

(22) Filed: Dec. 4, 2019

(65) Prior Publication Data

US 2020/0106074 A1 Apr. 2, 2020

Related U.S. Application Data

(63) Continuation of application No. PCT/KR2019/001045, filed on Jan. 24, 2019.

(30) Foreign Application Priority Data

Feb. 5, 2018 (KR) .................. 10-2018-0014093

(51) Int. Cl.
*H01M 50/502* (2021.01)
*H01M 50/209* (2021.01)
*H01M 50/20* (2021.01)

(52) U.S. Cl.
CPC ....... *H01M 50/502* (2021.01); *H01M 50/209* (2021.01); *H01M 50/20* (2021.01)

(58) Field of Classification Search
CPC .......................... H01M 50/502; H01M 50/209
See application file for complete search history.

(56) References Cited

U.S. PATENT DOCUMENTS

| | | |
|---|---|---|
| 2003/0049527 A1 | 3/2003 | Yageta et al. |
| 2014/0120406 A1 | 5/2014 | Kim |
| 2014/0370367 A1 | 12/2014 | Higuchi et al. |
| 2015/0056495 A1 | 2/2015 | Song |
| 2015/0064540 A1 | 3/2015 | Roh et al. |
| 2015/0064544 A1 | 3/2015 | Park |
| 2016/0149197 A1 | 5/2016 | Kang |
| 2016/0218401 A1* | 7/2016 | Hermann ............. H01M 50/20 |

FOREIGN PATENT DOCUMENTS

| | | |
|---|---|---|
| JP | 9-147829 A | 6/1997 |
| JP | 2007-229788 A | 9/2007 |
| JP | 2007-265945 A | 10/2007 |

(Continued)

OTHER PUBLICATIONS

International Search Report for PCT/KR2019/001045 (PCT/ISA/210) dated Apr. 25, 2019.

(Continued)

*Primary Examiner* — Kenneth J Douyette
(74) *Attorney, Agent, or Firm* — Birch, Stewart, Kolasch & Birch, LLP

(57) ABSTRACT

A battery module, which includes: a plurality of battery cells stacked on one another; and a bus bar assembly electrically connected to electrode leads of the plurality of battery cells, wherein the electrode leads of the plurality of battery cells are bent at least once to secure a predetermined length and are unbent at least partially due to inflation caused by swelling of the plurality of battery cells.

10 Claims, 4 Drawing Sheets

(56) References Cited

FOREIGN PATENT DOCUMENTS

| | | |
|---|---|---|
| JP | 2011-71133 A | 4/2011 |
| JP | 2011-171107 A | 9/2011 |
| JP | 2015-2141 A | 1/2015 |
| KR | 10-2012-0075377 A | 7/2012 |
| KR | 10-2012-0088122 A | 8/2012 |
| KR | 10-2013-0101894 A | 9/2013 |
| KR | 10-1361113 B1 | 2/2014 |
| KR | 10-1392799 B1 | 5/2014 |
| KR | 10-2015-0024560 A | 3/2015 |
| KR | 10-2015-0114277 A | 10/2015 |
| KR | 10-1664590 B1 | 10/2016 |
| KR | 10-2016-0127559 A | 11/2016 |
| WO | WO 2016/020999 A1 | 2/2016 |

OTHER PUBLICATIONS

Extended European Search Report for European Application No. 19747080.0, dated Nov. 30, 2020.

* cited by examiner

US 11,171,392 B2

BATTERY MODULE, AND BATTERY PACK AND AUTOMOBILE COMPRISING SAME

CROSS REFERENCE TO RELATED APPLICATIONS

The present application is a bypass continuation of PCT/KR2019/001045, filed Jan. 24, 2019 and claims priority to Korean Patent Application No. 10-2018-0014093 filed on Feb. 5, 2018 in the Republic of Korea, the disclosures of which are incorporated herein by reference.

TECHNICAL FIELD

The present disclosure relates to a battery module, and a battery pack and a vehicle including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.6V. Therefore, if a higher output voltage is required, a plurality of battery cells may be connected in series to configure a battery pack.

In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells is connected in series or in parallel to configure a battery pack, it is common to configure a battery module composed of at least one battery cell, and then configure a battery pack by using at least one battery module and adding other components. Here, the battery cells configuring the battery module or the battery pack are generally pouch-type secondary batteries that may be easily stacked on one another.

The conventional battery module generally includes a plurality of battery cells and a bus bar assembly electrically connected to electrode leads of the plurality of battery cells. Here, the electrode leads and the bus bar assembly are connected to each other by welding or the like.

However, in the conventional battery module, when swelling occurs at the battery module, the battery cells are inflated, which may cause the electrode leads connected to the bus bar assembly to be separated or disconnected from the bus bar assembly.

Here, the separated or disconnected electrode leads may cause short circuit with surrounding electrical components or adjacent other electrode leads, which may further increase the risk of explosion or fire of the battery module due to swelling.

Thus, a way to prevent the electrode leads of the battery cells from being separated from the bus bar assembly when swelling occurs at the battery module is needed. In addition, a way to reduce the tension applied to the electrode leads of the battery cells connected to the bus bar assembly, caused by the inflating force when swelling occurs at the battery module, is needed.

DISCLOSURE

Technical Problem

The present disclosure is directed to providing a battery module, which may prevent electrode leads of battery cells from being separated from a bus bar assembly when swelling occurs in the battery module, and a battery pack and a vehicle including the battery module.

In addition, the present disclosure is directed to providing a battery module, which may reduce the tension applied to the electrode leads of the battery cells connected to the bus bar assembly, caused by the inflating force when swelling occurs at the battery module, and a battery pack and a vehicle including the battery module.

Technical Solution

In one aspect of the present disclosure, there is provided a battery module, comprising: a plurality of battery cells stacked on one another; and a bus bar assembly electrically connected to electrode leads of the plurality of battery cells, wherein the electrode leads of the plurality of battery cells are bent at least once to secure a predetermined length and are unbent at least partially due to inflation caused by swelling of the plurality of battery cells.

Electrode leads of battery cells disposed at outermost sides among the plurality of battery cells may be bent further with a longer length than electrode leads of the other battery cells.

The electrode leads of the plurality of battery cells may have gradually greater lengths from a center portion of the plurality of battery cells in the stacking direction toward the outermost sides.

The electrode leads of the plurality of battery cells may be bent more times from the center portion of the plurality of battery cells in the stacking direction toward the outermost sides.

The electrode leads of the plurality of battery cells may be disposed to be symmetric based on the center portion of the plurality of battery cells in the stacking direction.

The bus bar assembly may include: a bus bar frame configured to cover at least one side of the plurality of battery cells; and a connection bus bar provided to the bus bar frame and connected to the electrode leads of the plurality of battery cells.

In addition, the present disclosure provides a battery pack, comprising: at least one battery module according to the former embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may prevent electrode leads of battery cells from being separated from bus bar assembly when swelling occurs at the battery module, and a battery pack and a vehicle including the battery module.

In addition, according to various embodiments as above, it is possible to provide a battery module, which may reduce the tension applied to the electrode leads of the battery cells connected to the bus bar assembly, caused by the inflating force when swelling occurs at the battery module, and a battery pack and a vehicle including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
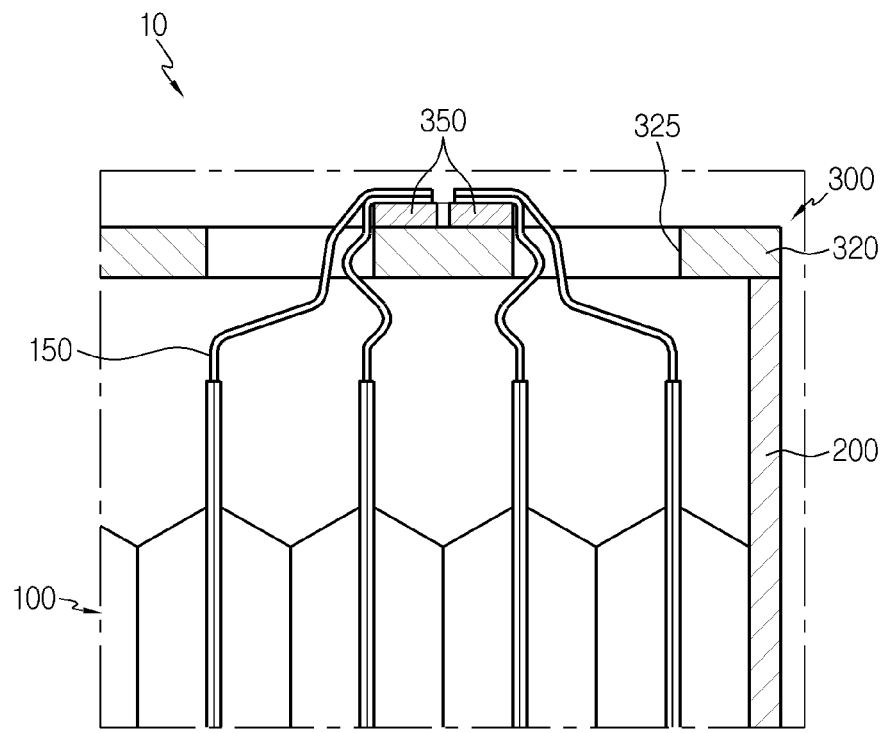
FIG. 1 depicts a battery module according to an embodiment of the present disclosure.
Figure 2:
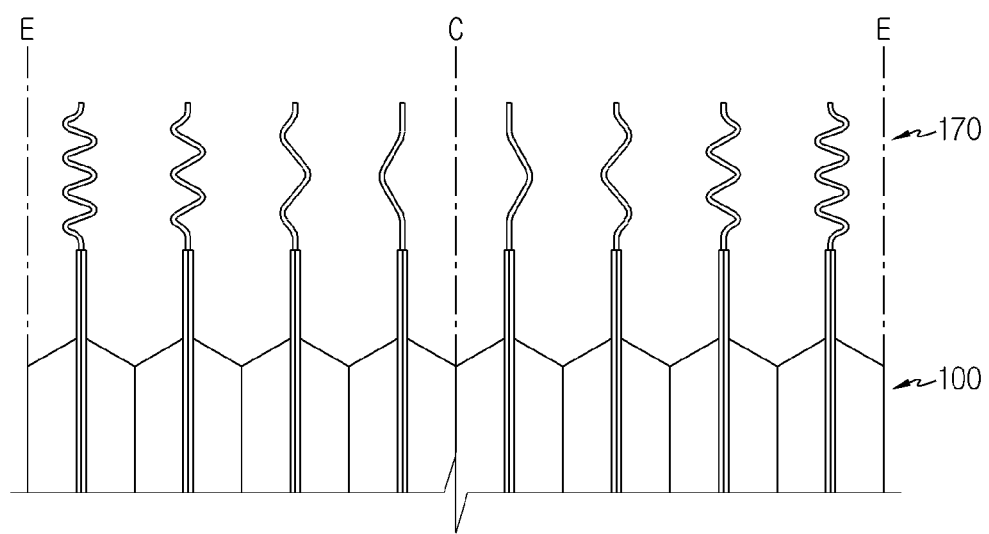
FIG. 2 depicts electrode leads of battery cells, employed at the battery module of FIG. 1, according to another embodiment.

FIG. 1 depicts a battery module according to an embodiment of the present disclosure, and FIG. 2 depicts electrode leads of battery cells, employed at the battery module of FIG. 1, according to another embodiment.

Referring to FIGS. 1 and 2, a battery module 10 may include a battery cell 100, a module case 200, and a bus bar assembly 300.

The battery cell 100 is a secondary battery and may be a pouch-type secondary battery. In addition, the battery cell 100 may also be a cylindrical secondary battery or a rectangular secondary battery.

Hereinafter, in this embodiment, the battery cell 100 will be explained as a pouch-type secondary battery.

The battery cell 100 may be provided in plural. The plurality of battery cells 100 may be stacked to be electrically connected to each other. Specifically, the plurality of battery cells 100 may be electrically connected to each other through the bus bar assembly 300, explained later.

Each of the plurality of battery cells 100 may include an electrode assembly, a battery case for accommodating the electrode assembly, and an electrode lead 150 protruding out of the battery case and connected to the electrode assembly.

Here, the electrode lead 150 of each battery cell 100 may be electrically connected to the electrode lead 150 of a neighboring battery cell 100. Specifically, the electrode lead 150 of any one battery cell 100 may be connected to the electrode lead 150 and the bus bar assembly 300, explained later, of a neighboring battery cell 100 by welding or the like.

More specifically, the electrode leads 150 of the plurality of battery cells 100 may be bent at least once at the outside of the battery case to secure a predetermined length and may be at least partially unbent due to swelling of the plurality of battery cells 100.

Meanwhile, the electrode leads 150 of the plurality of battery cells 100 may have different protruding lengths out of the battery case. Protruding lengths refers to the entire length of the electrode lead as opposed to effective length which is the length in a straight line between ends of the electrode lead. The protruding length will therefore be the same as or greater than the effective length. For example, as shown in FIG. 2, the electrode leads 170 of the plurality of battery cells 100 have protruding lengths which are gradually increased from a center portion C of the plurality of battery cells 100 in the stacking direction toward outermost sides E but equal effective lengths due to the increased number of bends in the battery cells further from the center portion C.

This is because the battery cells 100 disposed at the outermost sides are moved most severely in the stacking direction among the plurality of battery cells 100 when swelling occurs at the battery module 10.

More specifically, the electrode leads 170 of the battery cells 100 disposed at the outermost sides E among the plurality of battery cells 100 may be bent further with a greater protruding length than the electrode leads 170 of the other battery cells 100. In addition, the electrode leads 170 of the plurality of battery cells 100 may be bent more times from the center portion C of the plurality of battery cells 100 in the stacking direction toward the outermost sides E.

Accordingly, the electrode leads 170 of the plurality of battery cells 100 may be arranged to be symmetric based on the center portion C of the plurality of battery cells 100 in the stacking direction.

The module case 200 may accommodate the plurality of battery cells 100 and package the plurality of battery cells 100. To this end, the module case 200 may have an accommodation space for accommodating the plurality of battery cells 100.

The bus bar assembly 300 may cover at least one side of the plurality of battery cells 100 and be electrically connected to the electrode leads 150 of the plurality of battery cells 100.

The bus bar assembly 300 may include a bus bar frame 320 and a connection bus bar 350.

The bus bar frame 320 may cover at least one side of the plurality of battery cells 100 and be coupled to the module case 200. The bus bar frame 320 may have a plurality of slots 325 through which the electrode leads 150 of the plurality of battery cells 100 may pass.

The connection bus bar 350 is provided to the bus bar frame 320 and may be provided in plural. Each of the plurality of connection bus bars 350 may be connected to the electrode leads 150 of two battery cells 100 by welding or the like.

Hereinafter, the shape of the electrode leads 150 of the plurality of battery cells 100 when swelling occurs at the battery module 100 of this embodiment will be described in detail.

Figure 3:
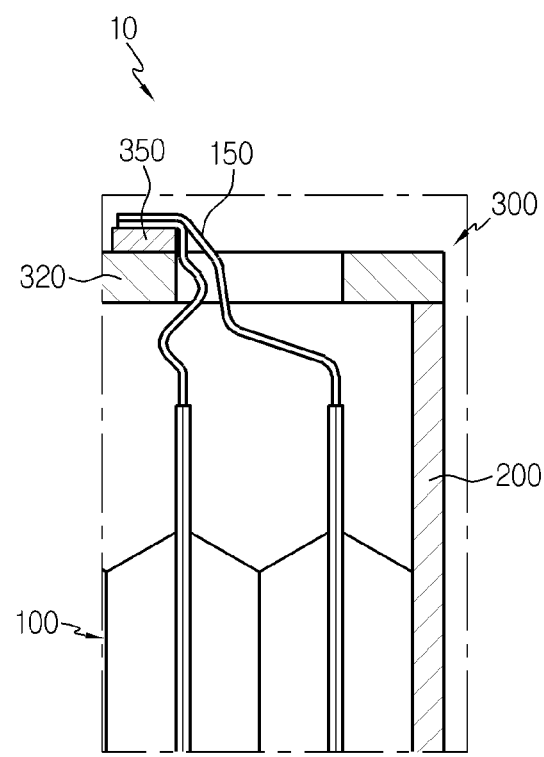
FIG. 3 depicts the electrode leads of the battery cells, employed at the battery module of FIG. 1, before swelling.
Figure 4:
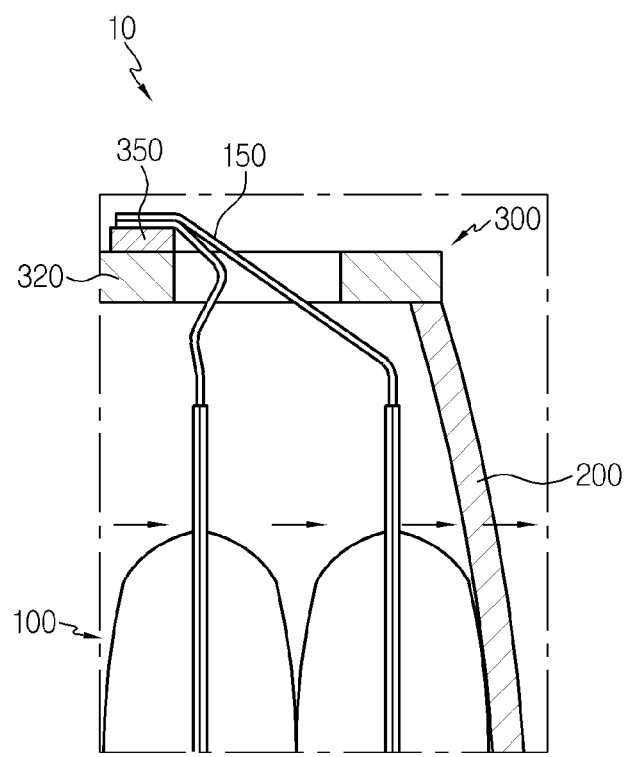
FIG. 4 depicts the electrode leads of the battery cells, employed at the battery module of FIG. 1, after swelling.

FIG. 3 depicts the electrode leads of the battery cells, employed at the battery module of FIG. 1, before swelling, and FIG. 4 depicts the electrode leads of the battery cells, employed at the battery module of FIG. 1, after swelling.

Referring to FIGS. 3 and 4, when swelling occurs at the battery module 10, the plurality of battery cells 100 may be inflated. As the plurality of battery cells 100 are inflated, the plurality of battery cells 100 may be displaced laterally inside the module case 200. As seen in FIG. 3, the electrode leads extend upward from the battery cell in a second direction and then are bent at a bending point in a direction of a connection point to the bus bar assembly. The protruding length from the bending point to the connection point is greater than an effective length from the bending point to the connection point for each battery cell.

Specifically, as shown in FIG. 4, when the swelling occurs, the battery cells 100 may be pressed and deformed. The displacement may be most severe at the battery cells 100 disposed at the outermost sides among the plurality of battery cells 100 due to the cumulative effect of swelling of the plurality of battery cells.

Accordingly, tension may be applied to the electrode leads 150 of the battery cells 100 connected to the bus bar assembly 300. In this embodiment, since the electrode leads 150 are initially bent at least once to secure a predetermined length in the space between the connection bus bar 350 of the bus bar assembly 300 and the interior of the module case 200, the bent portion may be unbent when the swelling occurs, thereby reducing the tension applied to the electrode leads 150.

Thus, in this embodiment, when swelling occurs at the battery module 10, it is possible to more effectively prevent the electrode leads 150 connected to the bus bar assembly 300 from being separated or disconnected from the bus bar assembly 300 due to the inflation of the battery cells 100.

In this embodiment, when swelling occurs at the battery module 10, it is possible to prevent the electrode leads 150 of the battery cells 100 from being separated or disconnected, thereby greatly reducing the risk of short circuit with surrounding electrical components or adjacent other electrode leads 150.

Thus, in this embodiment, when swelling occurs at the battery module 10, it is possible to significantly solve the risk of explosion or fire of the battery module 100.

Figure 5:
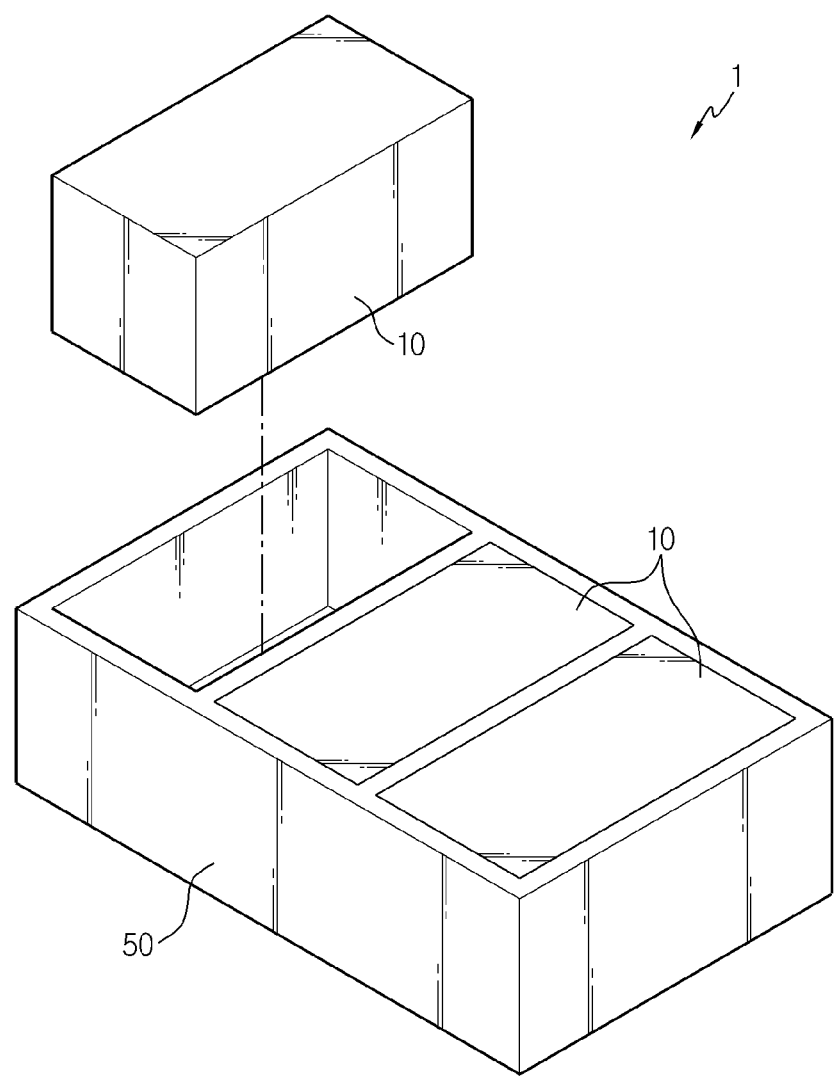
FIG. 5 depicts a battery pack according to an embodiment of the present disclosure.

FIG. 5 is a diagram for illustrating a battery pack according to an embodiment of the present disclosure.

Referring to FIG. 5, a battery pack 1 may include at least one battery module 10 according to the former embodiment and a pack case 50 for packaging the at least one battery module 10.

The battery pack 1 may be provided to a vehicle as a power source of the vehicle. As an example, the battery pack 1 may be provided to an electric vehicle, a hybrid electric vehicle, or any other vehicle that may use the battery pack 1 as a power source.

In addition, the battery pack 1 may be provided to other devices, instruments, equipment or the like such as an energy storage system using a secondary battery as well as the vehicle.

The devices, instruments and equipment such as the vehicle including the battery pack 1 as well as the battery pack 1 according to this embodiment include the battery module 10 described above. Thus, it is possible to implement the battery pack 1 as well as the devices, instruments and equipment such as the vehicle including the battery pack 1, which has all of the advantages of the battery module 10 described above.

According to various embodiments as above, it is possible to provide a battery module 10, which may prevent electrode leads 150, 170 of battery cells 100 from being separated from bus bar assembly 300 when swelling occurs at the battery module 10, and a battery pack 1 and a vehicle including the battery module.

In addition, according to various embodiments as above, it is possible to provide a battery module 10, which may reduce the tension applied to the electrode leads 150, 170 of the battery cells 100 connected to the bus bar assembly 300, caused by the inflating force when swelling occurs at the battery module 10, and a battery pack 1 and a vehicle including the battery module.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a plurality of battery cells stacked on one another in a first direction, each of the plurality of battery cells having a body and an electrode lead extending from the body; and
   a bus bar assembly electrically connected to electrode leads of the plurality of battery cells,
   wherein each of the electrode leads of the plurality of battery cells has at least one curved portion to secure a protruding length which is unbent due to swelling of the plurality of battery cells, and
   wherein electrode leads of battery cells disposed at outermost sides among the plurality of battery cells have a greater number of the at least one curved portion with a greater protruding length than electrode leads of other battery cells.

2. The battery module according to claim 1, wherein the electrode leads of the plurality of battery cells have progressively greater protruding lengths from a center portion of the plurality of battery cells in the stacking direction toward the outermost sides.

3. The battery module according to claim 2, wherein the electrode leads of the plurality of battery cells have a greater number of the at least one curved portion from the center portion of the plurality of battery cells in the stacking direction toward the outermost sides.

4. The battery module according to claim 2, wherein the electrode leads of the plurality of battery cells are disposed to be symmetric based on the center portion of the plurality of battery cells in the stacking direction.

5. The battery module according to claim 1, wherein the bus bar assembly includes:
   a bus bar frame configured to cover at least one side of the plurality of battery cells; and
   a connection bus bar provided to the bus bar frame and connected to the electrode leads of the plurality of battery cells.

6. A battery pack, comprising:
   at least one battery module defined in claim 1; and
   a pack case configured to package the at least one battery module.

7. A vehicle, comprising at least one battery pack defined in claim 6.

8. The battery module according to claim 1, wherein each of the electrode leads has a connection point to the bus bar assembly and a bending point to angle the electrode lead toward the connection point,
   wherein the protruding length between the bending point and connection point is greater than an effective length between the bending point and connection point.

9. The battery module according to claim 1, wherein each of the electrode leads has a connection point to the bus bar assembly and a bending point to angle the electrode lead toward the connection point, wherein the at least one bend is between the bending point and the connection point.

10. The battery module according to claim 1, wherein a number of the at least one curved portion increase with a distance from the bus bar assembly to a battery cell of the plurality of battery cells.

\* \* \* \* \*